United States Patent
Gundavelli et al.

(10) Patent No.: US 12,192,322 B2
(45) Date of Patent: *Jan. 7, 2025

(54) BLOCKCHAIN DATA COMPRESSION AND STORAGE

(71) Applicant: PAYPAL, INC., San Jose, CA (US)

(72) Inventors: Suryatej Gundavelli, San Jose, CA (US); Charles Gabriel Neale Dalton, San Jose, CA (US); Michael Jim Tien Chan, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,231

(22) Filed: Apr. 5, 2023

(65) Prior Publication Data
US 2023/0261852 A1    Aug. 17, 2023

Related U.S. Application Data

(63) Continuation of application No. 17/096,208, filed on Nov. 12, 2020, now Pat. No. 11,652,604.

(51) Int. Cl.
*H04L 9/06* (2006.01)
*H04L 9/00* (2022.01)
*H04L 9/40* (2022.01)

(52) U.S. Cl.
CPC .......... *H04L 9/0618* (2013.01); *H04L 9/0643* (2013.01); *H04L 9/50* (2022.05)

(58) Field of Classification Search
CPC ....... H04L 9/0618; H04L 9/0643; H04L 9/50; H04L 63/123
See application file for complete search history.

(56) References Cited

U.S. PATENT DOCUMENTS 10,789,215 B1    9/2020    Tian
10,860,259 B1    12/2020   Winarski
(Continued)

FOREIGN PATENT DOCUMENTS

WO    WO-2018205137 A1 * 11/2018 ......... G06F 16/2272

OTHER PUBLICATIONS

Chen X., et al., "Bitcoin Blockchain Compression Algorithm for Blank Node Synchronization," 11th International Conference on Wireless Communications and Signal Processing (WCSP), Retrieved from Internet URL: https://ieeexplore.ieee.org/document/8928104, Retrieved on Dec. 9, 2019, 7 pages.
(Continued)

*Primary Examiner* — Darren B Schwartz
(74) *Attorney, Agent, or Firm* — Haynes and Boone, LLP

(57) ABSTRACT

Methods and systems described herein improve blockchain storage operations in a variety of environments. A blockchain compression system may determine that a blockchain compression condition associated with a blockchain having a first plurality of blocks has been satisfied. In response, the system compresses the first plurality of blocks using a first hash tree into a first root hash value and stores the first plurality of blocks in a first database. The blockchain compression system generates a first new era genesis block that includes the first root hash value and a first database address of the first database at which the first plurality of blocks are stored. The blockchain compression system stores the blockchain at one or more nodes in a blockchain network. The blockchain includes the first new era genesis block and any previous new era genesis blocks. This may effectively reduce storage requirements for the blockchain, in various embodiments.

20 Claims, 13 Drawing Sheets

(56) References Cited

U.S. PATENT DOCUMENTS

| | | |
|---|---|---|
| 10,885,022 B1 | 1/2021 | Tian |
| 11,042,518 B2 | 6/2021 | Lu et al. |
| 11,153,097 B1 | 10/2021 | Griffin |
| 11,212,110 B1 | 12/2021 | Griffin |
| 11,250,394 B1* | 2/2022 | Madisetti ............ G06Q 20/3825 |
| 11,368,286 B1 | 6/2022 | Wang |
| 11,729,175 B2* | 8/2023 | Haque ................. H04L 63/0435 |
| | | 726/1 |
| 2015/0143136 A1 | 5/2015 | Barney et al. |
| 2017/0243176 A1 | 8/2017 | Hanke et al. |
| 2017/0278186 A1 | 9/2017 | Creighton, IV et al. |
| 2018/0150835 A1* | 5/2018 | Hunt .................. G06Q 20/3827 |
| 2018/0152442 A1 | 5/2018 | Buldas et al. |
| 2018/0189312 A1 | 7/2018 | Alas et al. |
| 2018/0323963 A1* | 11/2018 | Stollman ............... H04L 9/3239 |
| 2019/0123890 A1* | 4/2019 | Scott ..................... H04L 9/3239 |
| 2019/0146946 A1 | 5/2019 | Zhang |
| 2019/0228386 A1 | 7/2019 | Onnainty |
| 2019/0288850 A1 | 9/2019 | Beecham et al. |
| 2020/0034457 A1* | 1/2020 | Brody .................. H04L 9/0819 |
| 2020/0034839 A1* | 1/2020 | Soundararajan ... G06Q 20/4014 |
| 2020/0110728 A1* | 4/2020 | Semenov ................. G06T 7/00 |
| 2020/0125269 A1* | 4/2020 | Karame ............... H04L 9/0643 |
| 2020/0125661 A1* | 4/2020 | Albright .................. H04L 9/50 |
| 2020/0143372 A1* | 5/2020 | Liu ....................... H04L 9/3239 |
| 2020/0145190 A1 | 5/2020 | Venkataramappa et al. |
| 2020/0151350 A1 | 5/2020 | Irazabal et al. |
| 2020/0160947 A1* | 5/2020 | Rasovsky .............. G16H 10/60 |
| 2020/0204349 A1* | 6/2020 | Sardesai ............... H04L 9/0637 |
| 2020/0204378 A1 | 6/2020 | Yang |
| 2020/0212932 A1* | 7/2020 | Bier ..................... H04L 9/0637 |
| 2020/0213093 A1 | 7/2020 | Zhang et al. |
| 2020/0225643 A1 | 7/2020 | Tugbo et al. |
| 2020/0226113 A1 | 7/2020 | Cuellar et al. |
| 2020/0250177 A1 | 8/2020 | Padmanabhan |
| 2020/0252406 A1 | 8/2020 | Padmanabhan et al. |
| 2020/0265046 A1 | 8/2020 | Tang et al. |
| 2020/0301944 A1* | 9/2020 | Lee .......................... H04L 9/50 |
| 2020/0341669 A1 | 10/2020 | Shabi et al. |
| 2020/0366489 A1 | 11/2020 | Assenmacher |
| 2020/0379856 A1 | 12/2020 | Jayachandran |
| 2020/0394175 A1 | 12/2020 | Novotny et al. |
| 2020/0394220 A1 | 12/2020 | Novotny et al. |
| 2021/0099283 A1 | 4/2021 | Schvey et al. |
| 2021/0295321 A1 | 9/2021 | Liu et al. |
| 2021/0344480 A1* | 11/2021 | Brown ................. H04L 9/0643 |
| 2022/0263818 A1* | 8/2022 | Corella ................ H04L 9/3231 |
| 2022/0413883 A1* | 12/2022 | Clebsch ................ H04L 63/123 |
| 2023/0379170 A1* | 11/2023 | Griffin ................. H04L 9/3239 |

OTHER PUBLICATIONS

International Search Report and Written Opinion for Application No. PCT/US2021/057042 mailed on Mar. 9, 2022, 9 pages.

International Preliminary Report on Patentability for Application No. PCT/US2021/057042 mailed on May 25, 2023, 7 pages.

Supplementary Partial European Search Report mailed Sep. 10, 2024 in related application No. EP 21892569.1, 11 pages.

Zima et al., "P2P Cryptocurrency Exchange and Blockchain Size Reduction," Brno, 2017, 53 pages.

* cited by examiner

BLOCKCHAIN DATA COMPRESSION AND STORAGE

CROSS REFERENCE TO RELATED APPLICATION

The present invention is a Continuation of U.S. patent application Ser. No. 17/096,208, filed Nov. 12, 2020 which is incorporated herein by reference in its entirety.

TECHNICAL FIELD

The present disclosure generally relates to blockchain technology, and hardware and software related thereto. More specifically, the present disclosure relates to systems and methods for blockchain data compression and storage according to various environments.

BACKGROUND

Blockchains may be used for transactions involving Bitcoin, Ethereum, Litecoin, Monero, and/or a variety of other distributed cryptocurrencies. Virtual currency systems may provide unregulated, digital money that may be issued and controlled by distributed software created by a virtual currency developer of that virtual currency, rather than by central banks or public authorities that issue and control fiat currencies. For example, Bitcoin is a type of decentralized virtual currency that provides for peer-to-peer transactions without an intermediary, with those peer-to-peer transactions verified by Bitcoin network nodes and recorded in a public distributed ledger called a blockchain. Over time, the storage needs of a blockchain continue to grow and grow as more transactions are verified by the network nodes and added as blocks to the blockchain. As such, the blockchain becomes very storage intensive and more difficult to maintain. Also, distributing a large blockchain over a peer-to-peer network utilizes network resources and increases transfer times in comparison to a relatively smaller blockchain. Applicant recognizes there is an opportunity to improve storage management of information on blockchains, particularly bigger blockchains that may include a larger number of historical transactions.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

Figure 1:
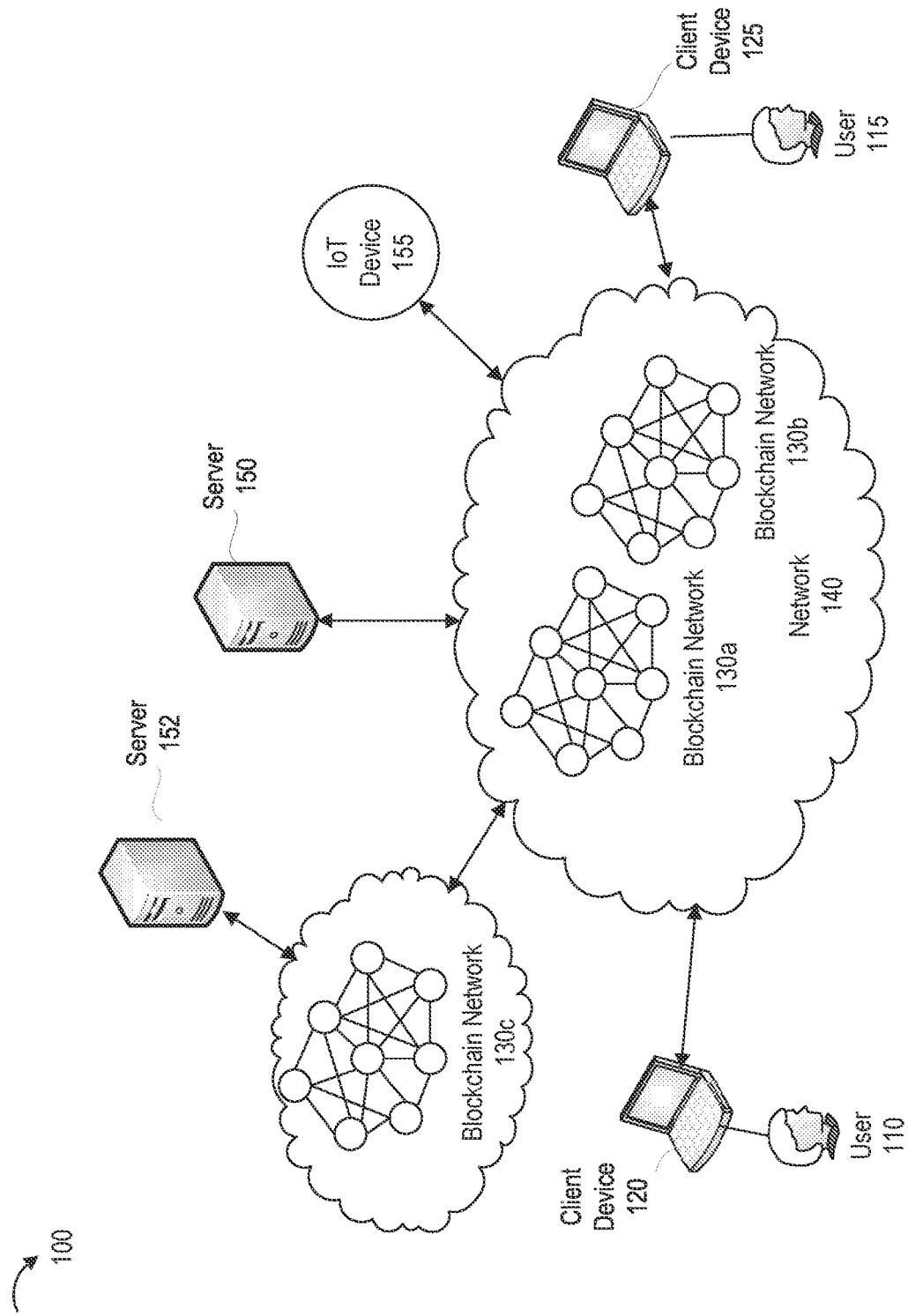
FIG. 1 is a block diagram illustrating a computing architecture for facilitating one or more blockchain based transactions according to an embodiment of the present disclosure.

FIGS. 1-6 and FIGS. 14-15 will describe certain aspects of blockchain operations, according to some embodiments. FIGS. 7-13 will describe more particular aspects relating to blockchain storage management, according to some embodiments.

In the following description of the various embodiments, reference is made to the accompanying drawings identified above and which form a part hereof, and in which is shown by way of illustration various embodiments in which aspects described herein may be practiced. It is to be understood that other embodiments may be utilized, and structural and functional modifications may be made without departing from the scope described herein. Various aspects are capable of other embodiments and of being practiced or being carried out in various different ways.

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others the distributed ledger represents each transaction where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser.

Implementations of the present disclosure will now be described in detail with reference to the accompanying figures.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

In blockchain systems, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. However, in some situations the elimination of blocks at the beginning of the blockchain may be after the blockchain reaches an undesirable size. In other situations, all of the data stored in the early blocks of the blockchain may be relevant, and thus eliminating the blocks may never be possible.

The systems and methods of the present disclosure describe a blockchain compression system that may compress a blockchain by calculating a hash root value of set of blocks of the blockchain when the blockchain satisfies a blockchain compression condition. The set of blocks or the portion of the blockchain may be used as data for a Merkle tree. The blockchain portion that includes the blocks on which the root hash value of the Merkle tree is based may be stored in a service provider's database. The service provider that stores the blockchain portion may be selected based on that service provider satisfying a storage condition. The nodes of the blockchain network may generate a new era genesis block that includes a database address where the blockchain portion is stored and the root hash value for those blocks. The new ere genesis block may be the blockchain that is distributed to other nodes and on which additional blocks may be added to the blockchain. Any queries for information associated with the stored portion of the blockchain may result in the retrieval of the database address and the root hash value from the new era genesis block and a call to the database address with the root hash value to complete the query. As such, the blockchain may periodically be compressed and distributed and any prior compressed blocks can be accessed by referencing the root hash value stored in the new era genesis block and the database address in the new era genesis block. As such, the systems and methods of the present disclosure reduce network costs of transmitting and distributing a large blockchain. Furthermore, the blockchain of the present disclosure reduces the storage requirements of the nodes by distributing a compressed version of the blockchain.

Computing Architecture

As discussed above, the distributed ledger in a blockchain framework is stored, maintained, and updated in a peer-to-peer network. In one example the distributed ledger maintains a number of blockchain transactions. FIG. 1 shows an example blockchain compression system 100 for facilitating a blockchain transaction. The blockchain compression system 100 includes a first client device 120, a second client device 125, a first server 150, and an Internet of Things (IoT) device 155 interconnected via a network 140. The first client device 120, the second client device 125, and the first server 150 may be a computing device 1505 described in more detail with reference to FIG. 15. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 140 may be any of a variety of available networks, such as the Internet, and represents a worldwide collection of networks and gateways to support communications between devices connected to the network 140. The blockchain compression system 100 may also comprise one or more distributed or peer-to-peer (P2P) networks, such as a first, second, and third blockchain network 130a-c (generally referred to as blockchain networks 130). As shown in FIG. 1, the network 140 may comprise the first and second blockchain networks 130a and 130b. The third blockchain network 130c may be associated with a private blockchain as described below with reference to FIG. 2, and is thus, shown separately from the first and second blockchain networks 130a and 103b. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as the first user 110 of the first client device 120 and the second user 115 of the second client device 125 in FIG. 1. The server 150 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the server 150. The server 150 may send the requested transaction to one of the blockchain networks 130 to be validated and approved as discussed below.

Blockchain Network

Figure 2:
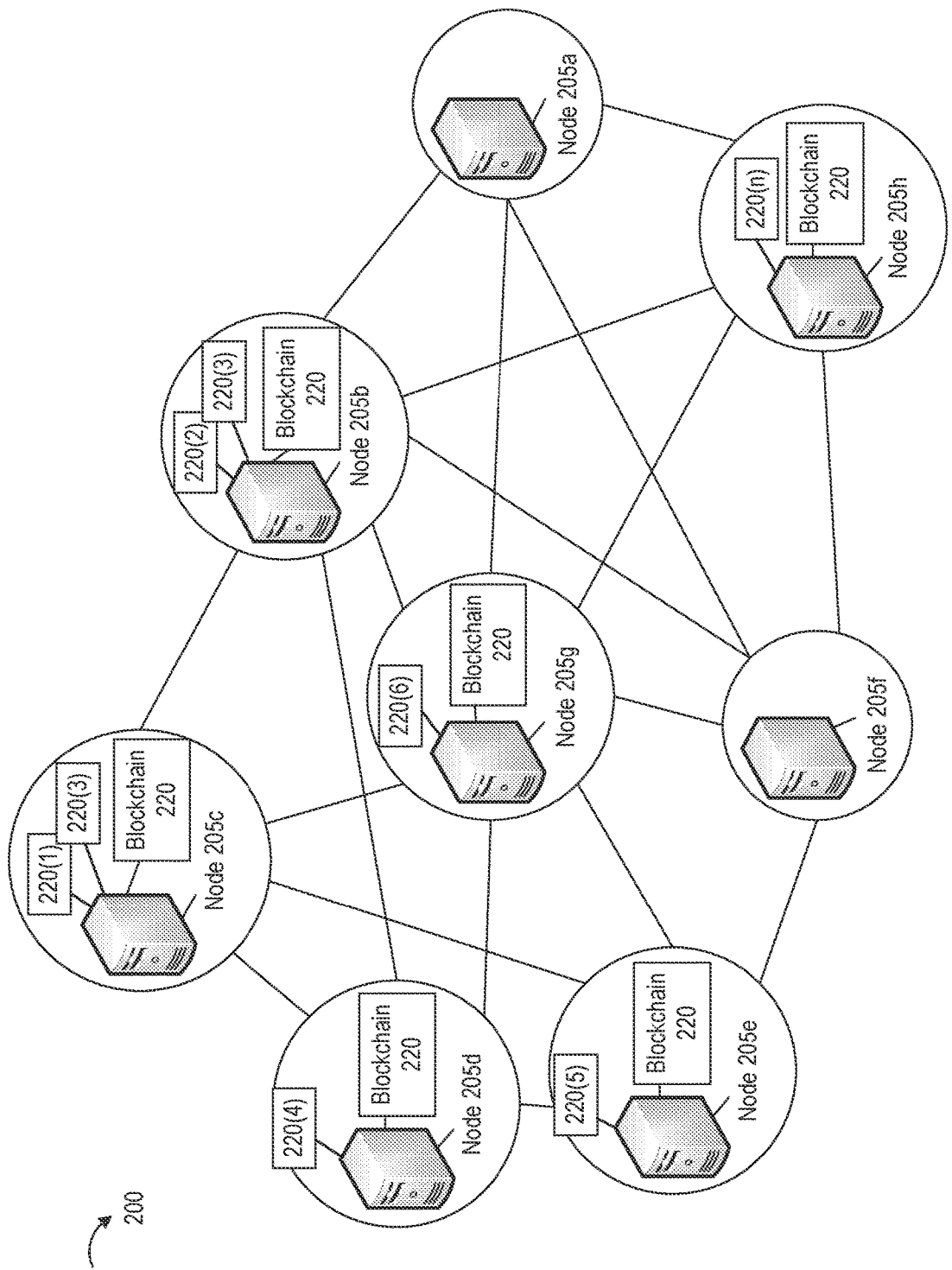
FIG. 2 is a block diagram illustrating an example blockchain network of the computer architecture of FIG. 1.

FIG. 2 shows an example blockchain network 200 comprising a plurality of interconnected nodes or devices 205a-h (generally referred to as nodes 205). Each of the nodes 205 may comprise a computing device 1505 described in more detail with reference to FIG. 15. Although FIG. 2 shows a single node 205, each of the nodes 205 may comprise a plurality of devices (e.g., a pool). The blockchain network 200 may be associated with a blockchain 220. Some or all of the nodes 205 may replicate and save an identical copy of the blockchain 220. For example, FIG. 2 shows that the nodes 205b-e and 205g-h store copies of the blockchain 220. The nodes 205b-e and 205g-h may independently update their respective copies of the blockchain 220 as discussed below.

Blockchain Node Types

Blockchain nodes, for example, the nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, IoT devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 2, the lightweight nodes 205a and 205f may not store a copy of the blockchain 220 and thus, may not publish new blocks on the blockchain 220.

In various embodiments of the present disclosure, the blockchain 220 may be a compressed version and may include a current distributed blockchain that includes the most current blocks and blockchain portions 220(1), 220(2), 220(3), 220(4), 220(5), 220(6) and/or up to 220(n) that may be each stored by one or more the full nodes 205b-e and 205g-h. However, in other embodiments, the blockchain portions 220(1)-220(n) may additionally or alternatively be stored by the server 150 and/or the server 152. Furthermore, in some embodiments, each of the nodes 205a-205h may be associated with a service provider that owns the node.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

Figure 3:
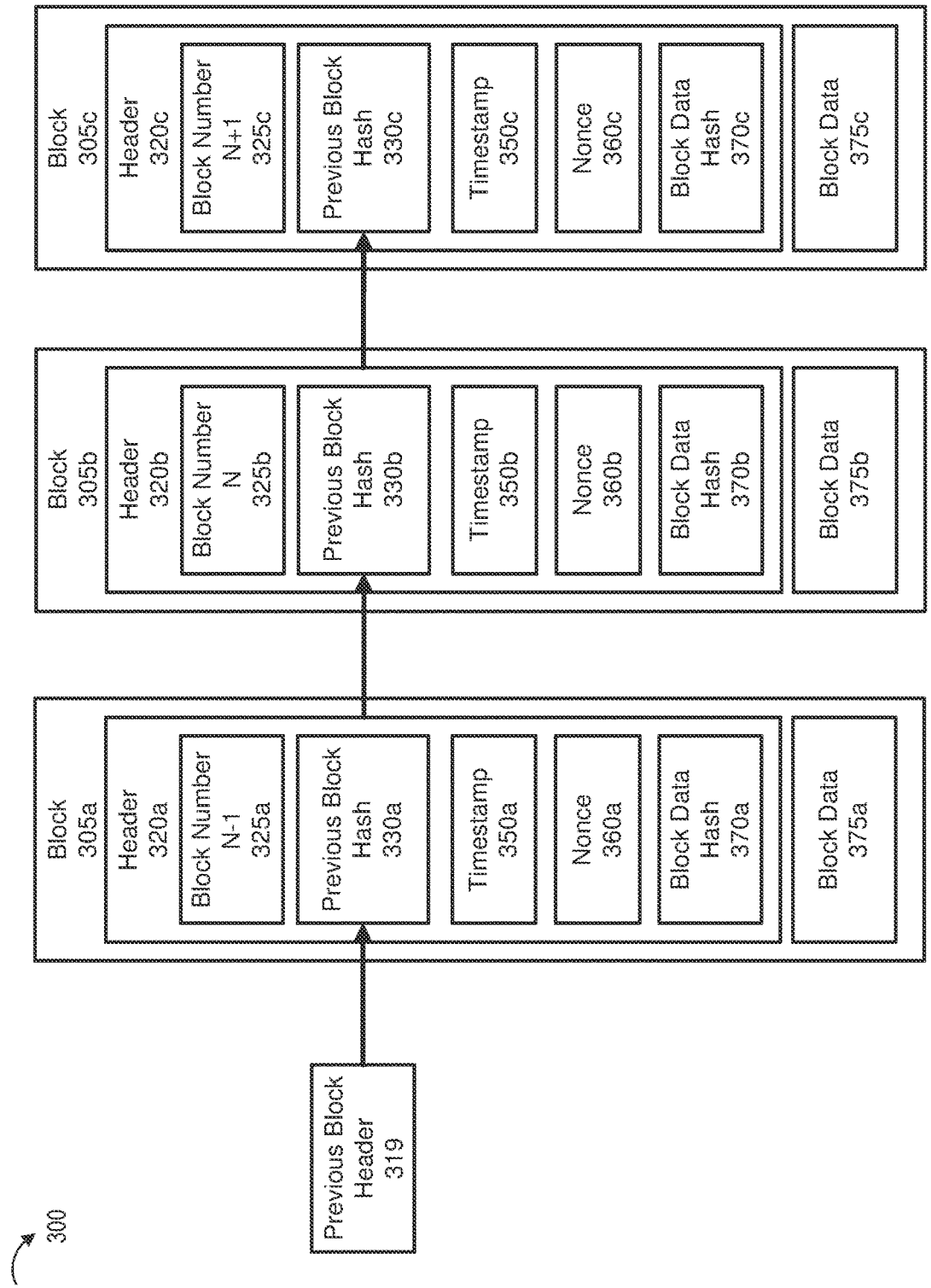
FIG. 3 is a schematic illustrating an example blockchain according to an embodiment of the present disclosure.

As discussed above, a blockchain 220 may be associated with a blockchain network 200. FIG. 3 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N-1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 320b of the block N (block 305b) includes a data field (previous block hash 330b) comprising a hash representation of the previous block N-1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The headers 320 may comprise other data, such as a difficulty target.

The blocks 305 may comprise respective block data 375a, 375b, and 375c (generally referred to as block data 375). The block data 375 may comprise a record of validated transactions that have also been integrated into the blockchain 220 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1, the server 150 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 4:
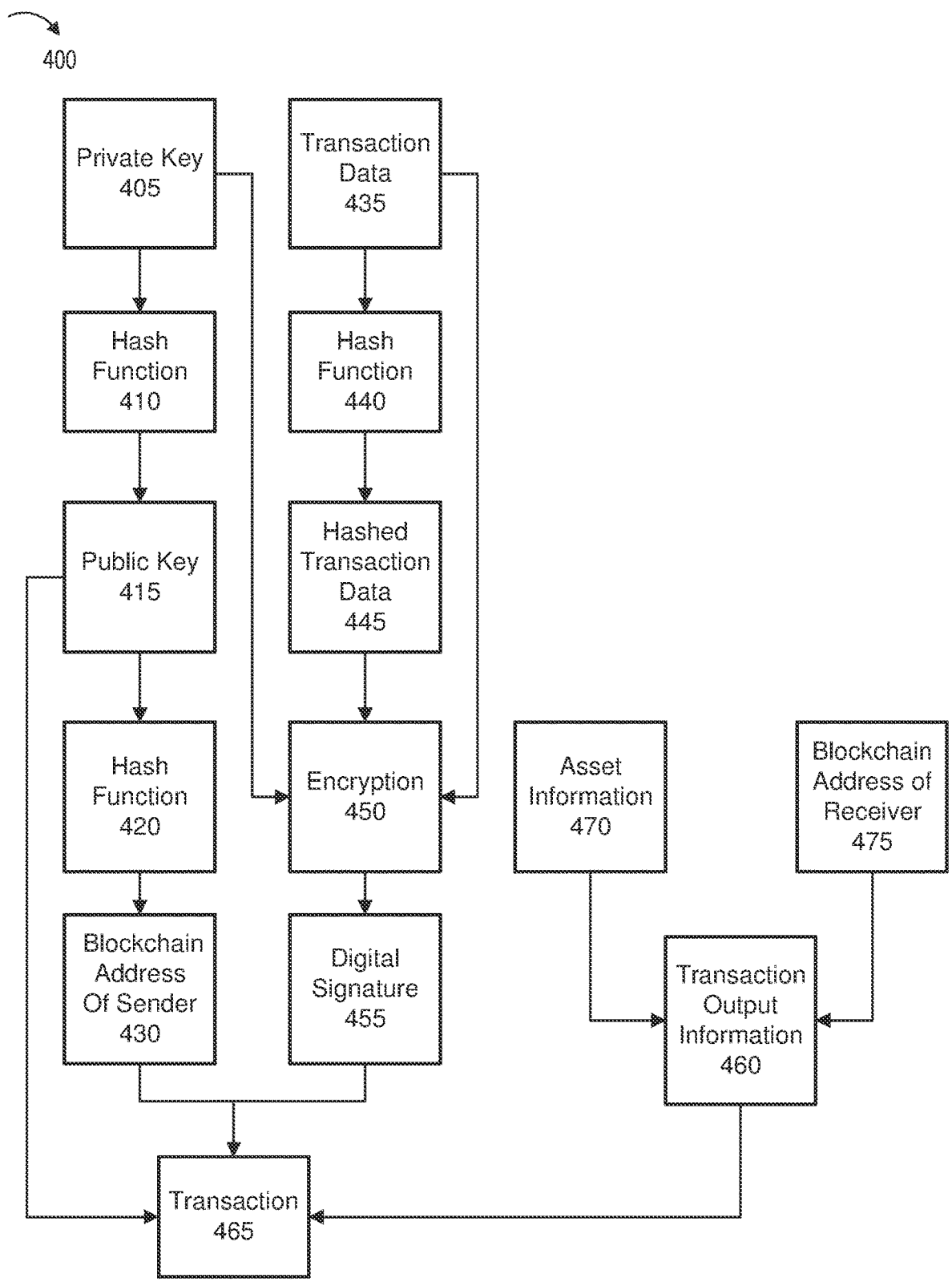
FIG. 4 illustrates a diagram of an example transaction message.

FIG. 4 is a diagram of a transaction 465 generated by the transaction application. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 470 and an address or identifier for the second user, such as the blockchain address 475. The transaction 465 may be sent from the first client device 120 to the server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 4 as the blockchain address 430 of sender, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
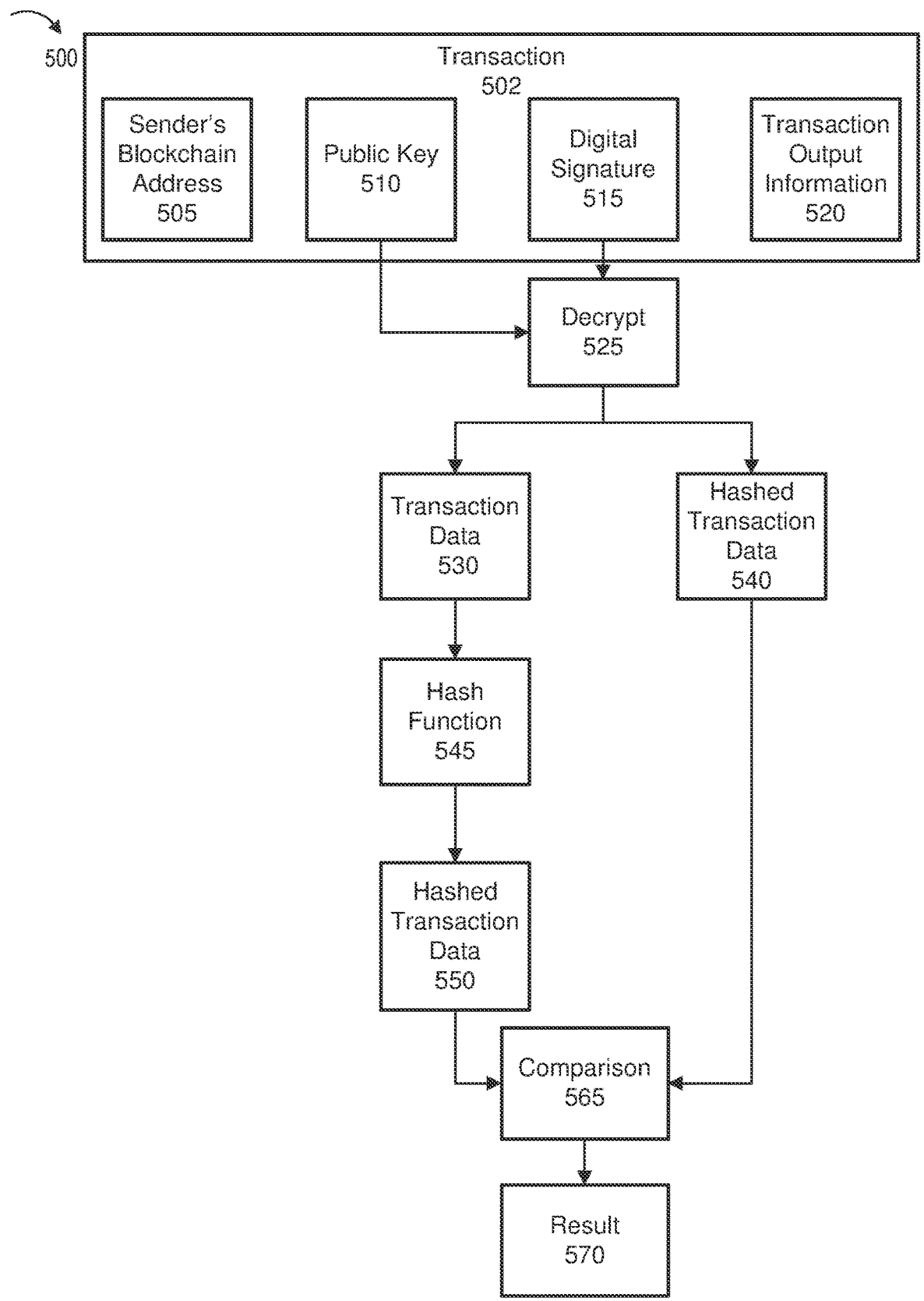
FIG. 5 shows an example transaction broadcast on the blockchain network.

The server 150 may receive transactions from users of the blockchain network 130. The transactions may be submitted to the server 150 via desktop applications, smartphone applications, digital wallet applications, web services, or other software applications. The server 150 may send or broadcast the transactions to the blockchain network 130. FIG. 5 shows an example transaction 502 broadcast by the server 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcast to one or more specific nodes based on criteria related to the node's geography, history, reputation, market conditions, docket/delay, technology platform. The rules may be dynamically modified or updated (e.g. turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

transaction VALIDATION—USER AUTHENTICATION AND TRANSACTION DATA INTEGRITY

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 110 is the originator of the transaction 465 by including the digital signature 455.

The node 205 may decrypt the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205a may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access to a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by any validation nodes of the nodes 205 of the blockchain network 130.

In a proof of work consensus model, a node validates a transaction, for example, by running a check or search through the current ledger stored in the blockchain. The node will create a new block for the blockchain that will include the data for one or more validated transactions (see, e.g., block 305 of FIG. 3). In a blockchain implementation such as Bitcoin, the size of a block is constrained. Referring back to FIG. 3, in this example, the block 305 will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the blockchain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue it causes a delay in completing the transaction. Reducing the time to complete a transaction may be important. A set of blockchain rules, or renumeration/compensation for a node to process the returned transaction may determine how a returned transaction is to treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive that the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g. in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcast to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain Based Application: Cryptocurrency

Cryptocurrency is a medium of exchange that may be created and stored electronically in a blockchain, such as the blockchain in the blockchain network 130*a* in FIG. 1. Bitcoin is one example of cryptocurrency, however there are several other cryptocurrencies. Various encryption techniques may be used for creating the units of cryptocurrency and verifying transactions. As an example, the first user 110 may own 10 units of a cryptocurrency. The blockchain in the blockchain network 130*a* may include a record indicating that the first user 110 owns the 10 units of cryptocurrency. The first user 110 may initiate a transfer of the 10 units of cryptocurrency to the second user 115 via a wallet application executing on the first client device 120. The wallet application may store and manage a private key of the first user 110. Examples of the wallet device include a personal computer, a laptop computer, a smartphone, a personal data assistant (PDA), etc.

Figure 6:
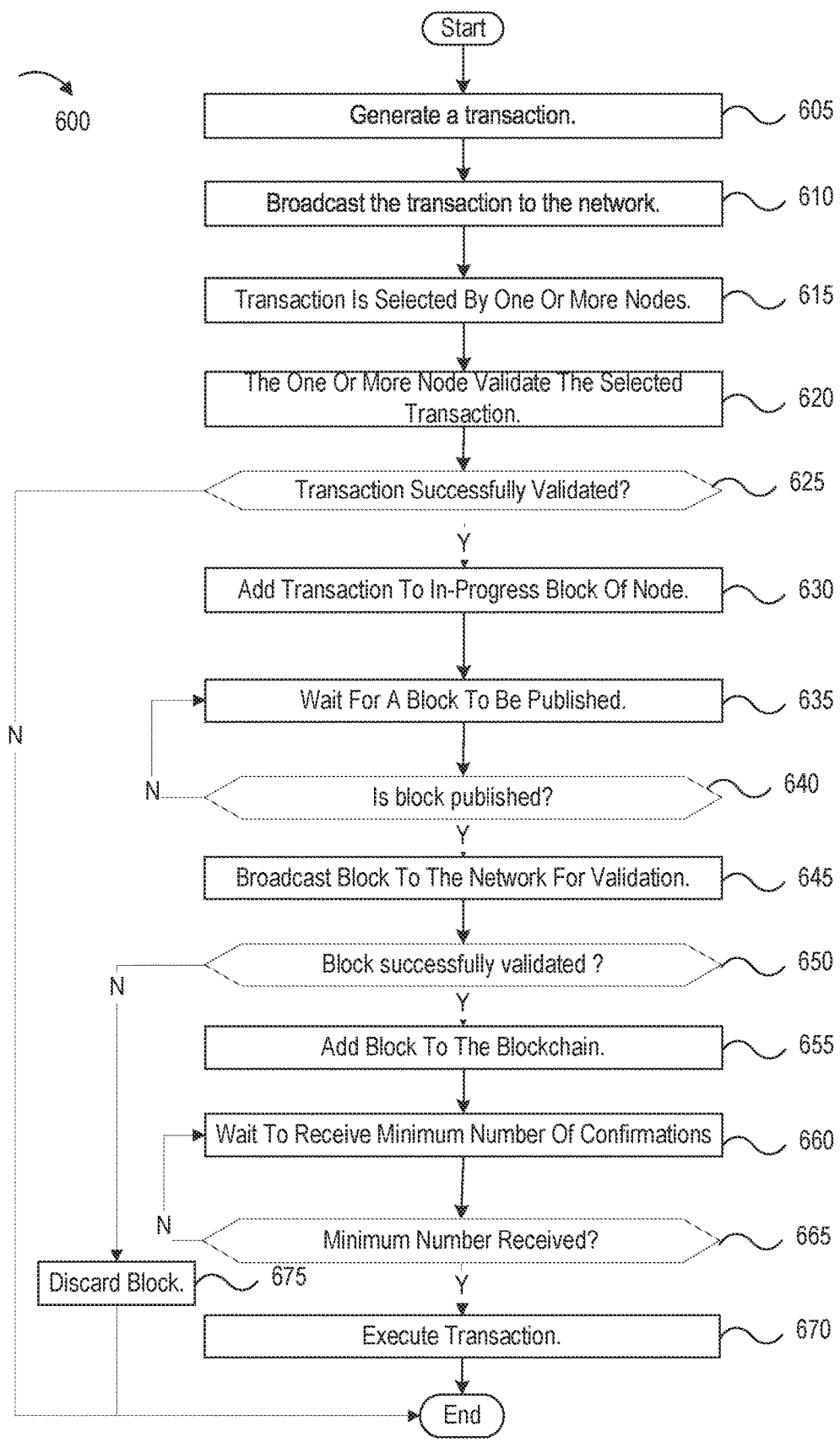
FIG. 6 is a flow diagram showing steps of an example method for performing a blockchain based transaction.

FIG. 6 is a flow diagram showing steps of an example method 600 for performing a blockchain transaction between entities, such as the first user 110 of the first client device 120 and the second user 115 of the second client device 125 in FIG. 1. The steps of the method 600 may be performed by any of the computing devices shown in FIG. 1. Alternatively or additionally, some or all of the steps of the method 600 may be performed by one or more other computing devices. Steps of the method 600 may be modified, omitted, and/or performed in other orders, and/or other steps added.

At step 605, the wallet application may generate transaction data for transferring the 10 units of cryptocurrency from the first user 110 to the second user 115. The wallet application may generate a public key for the transaction using the private key of the first user 110. In order to indicate that the first user 110 is the originator of the transaction, a digital signature may also be generated for the transaction using the private key of the first user 110. As discussed with reference to FIG. 4, the transaction data may include information, such as a blockchain address 430 of the sender, the digital signature 455, transaction output information 460, and the public key 415 of the sender. The transaction data may be sent to the server 150 from the first client device 120.

The server 150 may receive the transaction data from the first client device 120. At step 610, the server 150 may broadcast the transaction to the blockchain network 130*a*. The transaction may be received by one or more nodes 205 of the blockchain network 130*a*. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 625, if the transaction is successfully validated by a node 205, the validated transaction is added to a block being constructed by that node 205. As discussed above, since different nodes 205 may choose to validate different transactions, different nodes 205 may build or assemble a block comprising different validated transactions. Thus, the transaction associated with the first user 110 transferring 10 units of cryptocurrency to the second user 115 may be included in some blocks and not others.

At step 635, the blockchain network 130*a* may wait for a block to be published. Validated transactions may be added to the block being assembled by a node 205 until it reaches a minimum size specified by the blockchain. If the blockchain network 130*a* utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first user 110). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step

640, if a block has not been published, then the method 600 returns to step 635 and waits for a block to be published. However, at step 640, if a block has been published, then the method 600 proceeds to step 645.

At step 645, the published block is broadcast to the blockchain network 130a for validation. At step 650, if the block is validated by a majority of the nodes 205, then at step 655, the validated block is added to the blockchain 220. However, at step 650, if the block is not validated by a majority of the nodes 205, then the method 600 proceeds to step 675. At step 675, the block is discarded and the transactions in the discarded block are returned back to the queue. The transactions in the queue may be selected by one or more nodes 205 for the next block. The node 205 that built the discarded block may build a new next block.

At step 660, if the transaction was added to the blockchain 220, the server 150 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and assets from the first user 110 may be transferred to the second user 115. For example, the 10 units of cryptocurrency owned by the first user 110 may be transferred from a financial account of the first user 110 to a financial account of the second user 115 after the transaction receives at least three confirmations.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Blockchain Size

Depending on a frequency at which events are recorded in a blockchain, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 1000 transactions with a new block that effectively mimics the hash of the 1000 transactions may be useful for managing blockchain size. However, in some situations the elimination of blocks at the beginning of the blockchain may be after the blockchain reaches an undesirable size. In other situations, all of the data stored in the early blocks of the blockchain may be relevant, and thus eliminating the blocks may never be practicable. The systems and methods of the present disclosure address these issues with blockchain systems.

Figure 7:
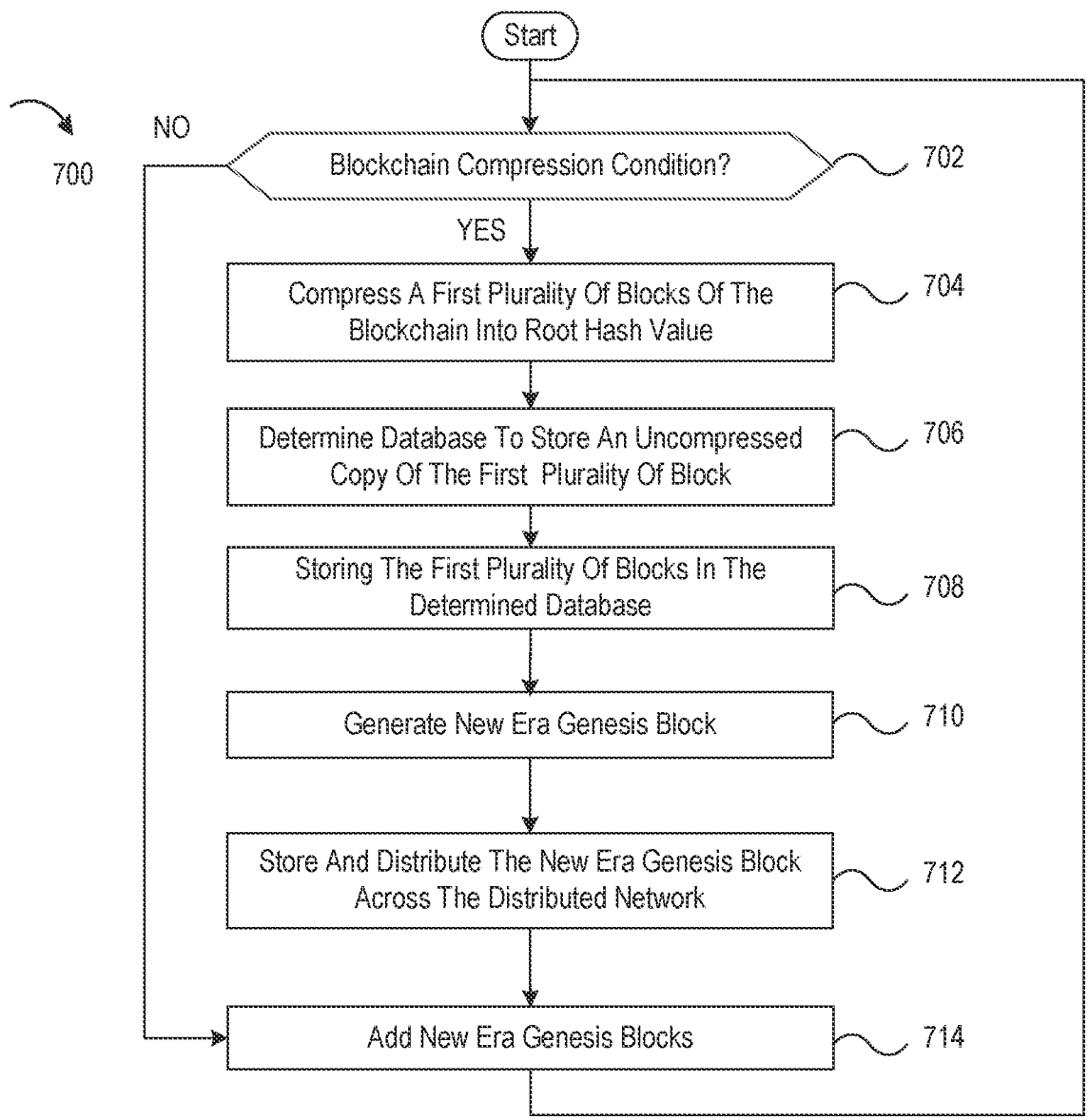
FIG. 7 is a flow diagram showing steps of an example method for performing blockchain compression.

Referring now to FIG. 7 a method 700 of blockchain compression is illustrated according to various embodiments. Operations described relative to FIG. 7 may be performed, in various embodiments, by any suitable computer system and/or combination of computer systems, included in blockchain compression system 100 of FIG. 1. For convenience and ease of explanation, however, operations described below will simply be discussed relative to the nodes 205b-205e, 205g, and/or 205h of the blockchain network 200 of FIG. 2, which may be any of the blockchain networks 130a, 130b, and/or 130c of FIG. 1. Further, various elements of operations discussed below may be modified, omitted, and/or used in a different manner or different order than that indicated. Thus, in some embodiments, the one or more full nodes 205b-205e, 205g, and/or 205h may perform one or more aspects described below, while another system might perform one or more other aspects.

The method 700 begins at step 702 where a determination is made as to whether a blockchain compression condition associated with a blockchain having a first plurality of blocks has been satisfied. In an embodiment, at step 702, a compression application on one or more of the nodes 205a-205h may determine whether a compression condition exists (the compression condition may indicate that storage of certain older blocks in the blockchain should be managed in accordance with techniques herein, in various embodiments). Thus, the one or more of the nodes 205a-205h may determine that a compression condition exists when the blockchain 220 includes a predetermined number of blocks. In other embodiments, one or more of the nodes 205a-205h may determine that the compression condition exists when the blockchain 220 reaches a predetermined size (e.g., 1 GB, 10 GB, 100 GB, or any other blockchain size that would benefit from the teachings of the present disclosure). In yet other embodiments, one or more of the nodes 205a-205h may determine that the compression condition exists when a predetermined time period has lapsed (e.g., 1 day, 1 week, 1 month, 6 months, 1 year, or any other time duration). In yet other embodiments, one or more of the nodes 205a-205h may determine that the compression condition exists when a predetermined latency on the blockchain network 200 has been detected. In yet other embodiments, one or more of the nodes 205a-205h may determine that the compression condition exists when a compression notification is received from any of the client device 120 and/or 125 and/or the servers 150 and/or 152. While specific examples of compression conditions are described, one of skill in the art in possession of the present disclosure will recognize that other compression conditions may fall under the scope of the present disclosure as well. Also, the compression condition may be satisfied when one or more of the compression conditions described above are satisfied.

If at step 702 a compression condition does not exist, the method 700 may continue to monitor the blockchain compression system 100 until a compression condition exists. If at step 702 the compression condition exists, the method 700 then proceeds to step 704, in various embodiments, where the first plurality of blocks of the blockchain are compressed into a root hash value using a hash tree. In an embodiment, at step 704, the compression application on one or more of the nodes 205b-205e, 205g, and/or 205h may compress the first plurality of blocks in the blockchain 220 in response to the blockchain compression condition being satisfied in step 702. For example, the node 205b-205e, 205g and/or 205h may compress their respective blockchain copies 220. However, in other examples, one node of the nodes 205b-205e, 205g and/or 205h may be elected by the nodes 205b-205e, 205g, and/or 205h to perform compression operations to the blockchain 220. In various embodiments, the number of nodes performing compression operations depends on the compression technique. For instance, for interleaving, one node would be responsible for compression operations and would communicate which node was responsible for which type of compression block. However, for Merkle Hashing, a designated coordinator node is not required so each individual node can perform the compression operation itself.

Figure 8:
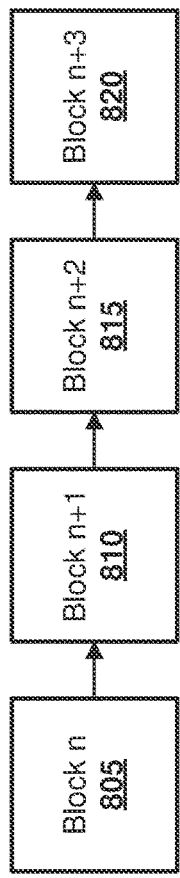
FIG. 8 shows an example of a blockchain according to the blockchain compression performed in the method of FIG. 7.
Figure 9:
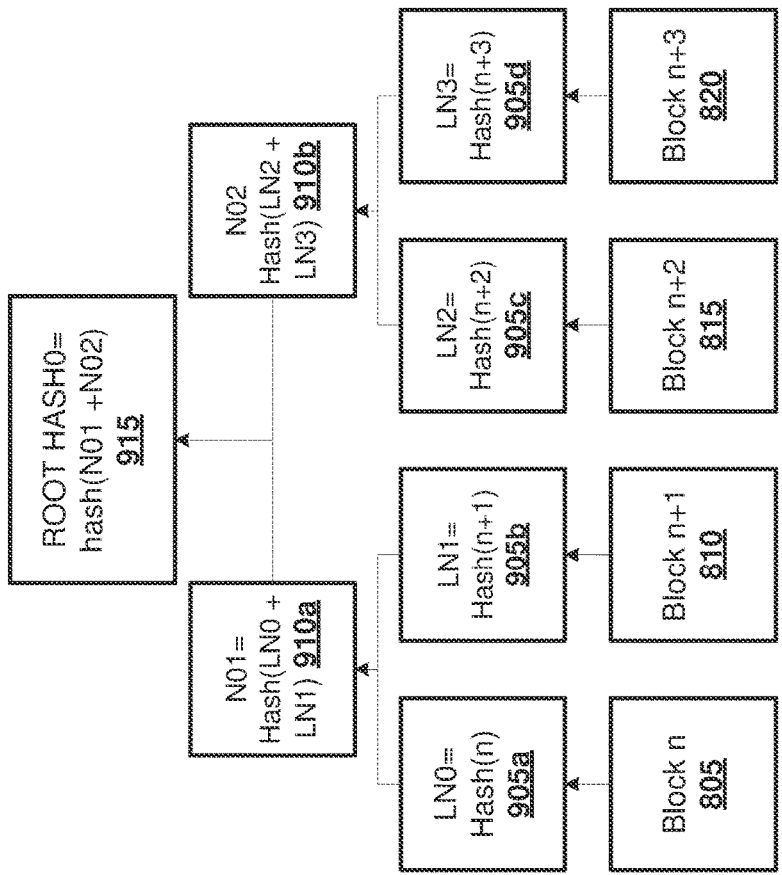
FIG. 9 shows an example Merkle tree of the blockchain of FIG. 8 generated during the method of FIG. 7.
Figure 10:
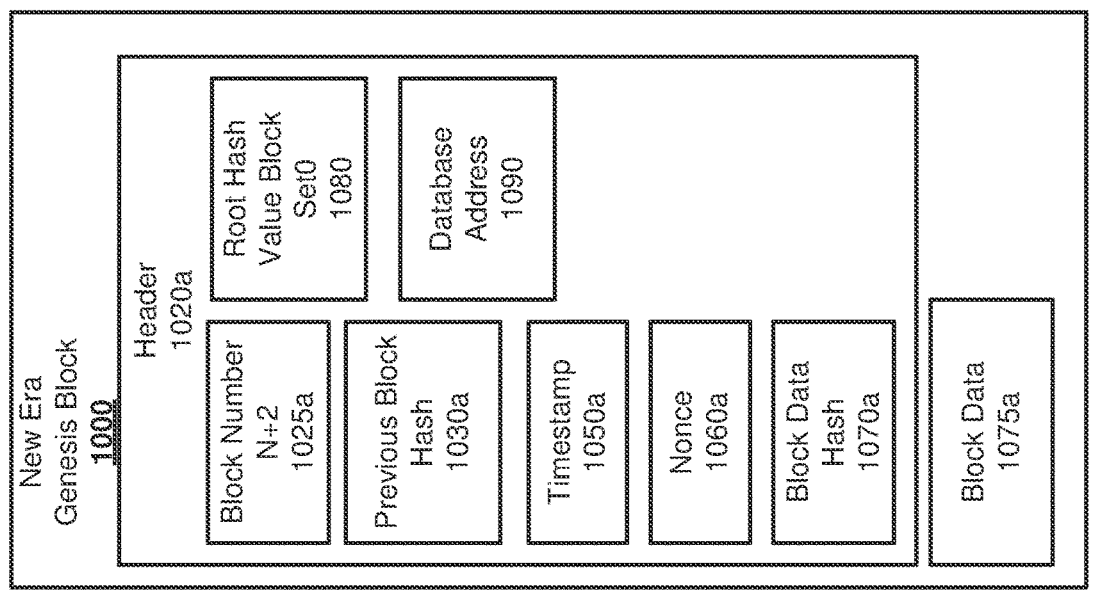
FIG. 10 illustrates an example new era genesis block for the blockchain of FIG. 8 generated during the method of FIG. 7.

With reference to FIG. 8 and FIG. 9, an example of step 702 and 704 is illustrated. FIG. 8 illustrates the blockchain 220, which may include blocks 805, 810, 815, and 820. Block 805 may be a genesis block or a new era genesis block, as discussed in further detail below. The blocks 810, 815, and 820 may be the blocks 305*a*, 305*b*, and 305*c* of FIG. 3, respectively. One or more of the nodes 205*b*-205*e*, 205*g*, and/or 205*h* may monitor the blockchain 220 until a blockchain compression condition is satisfied. In a simplified example, the blockchain compression condition may be satisfied in step 702 when the blockchain 220 has 4 blocks (e.g., blocks 805, 810, 815, and 820) or 3 blocks after the genesis block 805 (e.g., blocks 805, 810, 815). In various embodiments, at least one of the nodes 205*b*-205*e*, 205*g*, and 205*h* may generate a root hash value of a Merkle tree 900 of FIG. 9 (also referred to as a hash tree herein) that is a tree structure in which each leaf node 905*a*, 905*b*, 905*c*, and 905*d* of the Merkle tree 900 is a hash of each block of data (e.g., each block 805-820 of the blockchain 220 may be a respective block of data). Each non-leaf node 910*a* and 910*b* may be a hash of its children, which may be the leaf nodes or other non-leaf nodes depending on the size of the Merkle tree 900. This results in a single hash called the Merkle root that is referred to as a root hash value 915 herein. In a specific example, the node 205*b* may generate the leaf node 905*a* by hashing the block 805 using one of the hashing algorithms described above. Likewise, the node 205*b* may generate the leaf node 905*b* by hashing the block 810, the leaf node 905*c* by hashing the block 815, and the leaf node 905*d* by hashing the block 820. The node 205*b* may then generate the non-leaf node 910*a* by hashing the leaf node 905*a* and the leaf node 905*b* using the hashing algorithm. Similarly, the node 205*b* may generate the non-leaf node 910*b* by hashing the leaf node 905*c* and the leaf node 905*d*. The node 205*b* may then generate the root hash value 915 (e.g., root node) by hashing the non-leaf nodes 910*a* and 910*b*. In the illustrated example, the Merkle tree 900 is a binary hash tree because each non-leaf node 910*a* and 910*b*, and the root node 915 has two children. However, one of skill in the art will recognize that each non-leaf node may be the hash of any number of child nodes. Also, one of skill in the art will recognize that the Merkle tree 900 may have more than one level of non-leaf nodes, which depends on the number leaf nodes.

The method 700 then proceeds to step 706, in various embodiments, where a database to store the first plurality of blocks is determined (e.g. an entity who controls one or more databases may be selected to archive the first plurality of blocks). In an embodiment, at step 706, the compression application on the one or more nodes 205*b*-205*e*, 205*g*, and/or 205*h* may determine which of the nodes 205*a*-205*h* and/or service providers (e.g., a service provider of the server 150 or the service provider of the server 152 of FIG. 1) that are associated with the one or more of the nodes 205*a*-205*h* that will store an uncompressed copy of the first plurality of blocks of the blockchain 220 that are being compressed in response to the compression condition be satisfied. In various embodiments of the present disclosure, the raw data or raw blocks 805-820 of the blockchain 220 may be stored by one or more of the nodes 205*a*-205*h* and/or by the servers 150 and/or 152. The node 205*a*-205*h* and/or the server 150 and/or 152 on which the blocks 805-820 of the blockchain 220 is to be stored may be determined according to various mechanisms. For example, the blocks 805-820 of the blockchain 220 may be stored in a round robin fashion, such that for each time a compression condition is satisfied, the blocks of the blockchain 220 subject to the compression condition may be stored in a predefined order through the nodes 205*a*-205*h* and/or the servers 150 and/or 152.

In other examples, the selection of the node 205*a*-205*h* and/or the servers 150 and/or 152 on which to store the blocks 805-820 may be based on the transactions stored in those blocks 805-820. For example, if a service provider that is associated with a node of the nodes 205*a*-205*h* and/or associated with a server 150 and/or 152 is identified (e.g., via wallet addresses) as being the service provider that has conducted the most transactions and/or a predetermined threshold of transactions that are stored in the block data 375*a*-375*c* of the blocks 805-820, then the node or the server device of the nodes 205*a*-205*h* or the servers 150 and 152 associated with that service provider may be selected to store the blocks 805-820. Accordingly, if a particular block on a blockchain has 100 transactions, 90 of which correspond to a PayPal™ transaction, a PayPal-controlled database might be selected to archive that block. This can provide additional storage savings, as some institutional entities such as PayPal may need to retain copies of such transactions for other reasons as well.

In yet other embodiments, the blocks 805-820 may be auctioned to the service provider that has the highest bid for the blocks 805-820. The blockchain compression system 100 may incentivize various service provider's that are included the blockchain compression system 100 and that operate the one or more blockchain networks 130*a*-130*c* to store and manage the blocks 805-820. The service provider may desire to store blocks that they frequently access or blocks that are frequently accessed by others as there may be a fee associated with validating data stored in those blocks or for otherwise accessing those blocks for other entities, as discussed further below. While one of the nodes 205*a*-205*h*, a dedicated database of a plurality of dedicated storage databases, or one of the servers 150 and 152 may store the blocks 805-820, one of skill in the art in possession of the present disclosure will recognize that more than one of the nodes 205*a*-205*h*, more than one dedicated database of a plurality of dedicated storage databases, and/or more than one the servers 150 and 152 may store the blocks 805-820 for redundancy purposes. For example, if there is an attack or change to the blocks 805-820 to one of the copies of the block 805-820, a redundant copy may be used to restore stored blocks and the correct the change. Upon determining the database or databases in which the plurality of blocks of the blockchain are stored, the method 700 then proceeds to step 708 where the first plurality of blocks are stored in that database. In a specific example, the database may use a key value store with the key as either the block or a transaction hash.

The method 700 then proceeds to step 710 where, according to various embodiments, a first new era genesis block is generated that includes the first root hash value and a database identifier for a first entity that controls the first database. In an embodiment, at step 710 and with reference to FIG. 10, the compression application of one or more of the nodes of node 205*b*-205*e*, 205*g*, and 205*h* may generate a new era genesis block 1000 for the blockchain 220. Generally, the new era genesis block 1000 represents either a previous portion of the blockchain (e.g., a plurality of blocks linked from a previous new era genesis block and a compression condition) as a root hash value for that blockchain portion or the new era genesis block may represent the entire blockchain a single block where the blockchain is identified as a root hash value. The new era genesis block may also include location information to a database or databases in which the previous blocks of the blockchain represented by the new era genesis block 1000 are stored.

For example, the new era genesis block 1000 may include one or more data fields. The new era genesis block 1000 may include a header 1020*a* and block data 1075*a*. The header 1020 may comprise metadata associated with the new era genesis block 1000. For example, the header 1020*a* may comprise a block number 1025*a*. In some embodiments and continuing with the example described above with blocks 810-820 that may be the blocks 305*a*-305*c* of FIG. 3. The block number 1025*a* may be N+2. The header 1020*a* of the block 1000 may include a data field comprising a block size (not shown).

The block 1000 may be linked together and cryptographically secured with the blocks of data that it represents. For example, the header 1020*a* of the block 1000 includes a data field (previous block hash 1030*a*) comprising a hash representation of the previous block N+1's header 320*c*. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function.

The header 1020*a* of the new era genesis block 1000 may also include a data field that includes a hash representation of the block data 1075*a*, such as the block data hash 1070*a*. The block data hash 1070*a* may be generated, for example, by a Merkle tree and by storing the hash or by using a hash that is based on all of the block data. The header 1020*a* of the block 1000 may include a nonce 1060*a*. In some implementations, the value of the nonce 1060*a* is an arbitrary string that is concatenated with (or appended to) the hash of the block. The header 1020*a* may comprise other data, such as a difficulty target.

The header 1020*a* of the block 1000 may also include a data field that includes a root hash value 1080 of the blocks of the blockchain 220 subject to the compression condition such as the root hash value 915 illustrated in FIG. 9 of blocks 805-820 illustrated in FIG. 8. As discussed above, the root hash value 1080 may be generated, for example, by a Merkle tree based on the previous blocks 805-820. The header 1020*a* of the block 1000 may include a database address 1090 that identifies an address where the blocks 805-820 are stored.

The new era genesis block 1000 may include block data 1075*a*. The block data 1075*a* may comprise a record of validated transactions that have also been integrated into the blockchain 220 via the consensus model (described above). As discussed above, the block data 1075*a* may include a variety of different types of data in addition to validated transactions. Block data 1075*a* may include any data, such as text, audio, video, image, or file, that may be represented digitally and stored electronically.

The method 700 then proceeds to step 712 where the blockchain that includes the first new era genesis block and any previous new era genesis blocks is stored, according to various embodiments. In an embodiment, at step 712, the one or more nodes of the nodes 205*b*-205*e*, 205*g*, and/or 205*h* may store the copy of new era genesis block 1000. A copy of the new era genesis block 1000 may be distributed to any of the nodes 205*b*-205*e*, 205*g*, and/or 205*h* on the blockchain network 200. For example, if the node 205*b* generates the new era genesis block 1000, the node 205*b* may distribute the new era genesis block 1000 to any of the nodes 205*a*-205*h* in the blockchain network 200. The nodes 205*a* and/or up to 205 h that receive the new era genesis block 1000 may then store the new era genesis block 1000. The previous distributed copy of the blockchain 220 that included the blocks 805-820 may be deleted or removed from various nodes that have a copy of that blockchain. This may reduce the amount of storage needed for a functional copy of the blockchain (particularly as many different copies of the blockchain may be distributed to thousands or even millions of different devices). As such a node in the block chain network 200 may cause the blockchain (e.g., the new era genesis block and/or any previous new era genesis blocks as described herein) to be stored in the other nodes in the blockchain network. As such, the new era genesis block 1000 are distributed to all the nodes 205*b*-205*e*, 205*g*, and/or 205*h* on the blockchain network 200 so that they can build off of that one. The system will create a fork of the blockchain with the new era genesis block and build off of that. Once a significant number of blocks are built onto the new copy of the blockchain (e.g., 10 or any other number of blocks) then the node will begin to reference the blockchain with the new genesis block.

Figure 11:
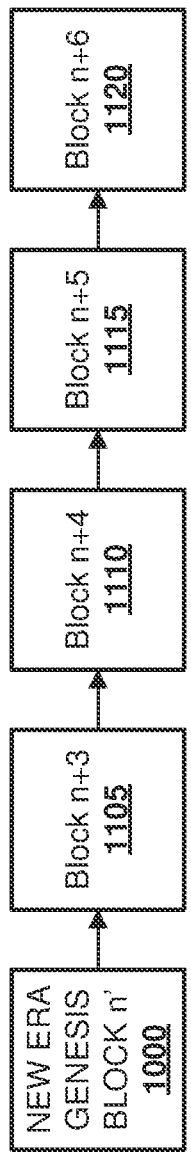
FIG. 11 illustrates an example blockchain that includes the new era genesis block of FIG. 10 generated during the method of FIG. 7.

The method 700 may then proceed to step 714 where, in various embodiments, a first new era block is added to the first new era genesis block. In an embodiment, at step 714, the blockchain compression system 100 may perform the method 600 of FIG. 6 where a transaction is completed and added to a block of the blockchain 220. The node 205*b*-205*e* and/or 205*g*-205*h* may perform step 655 of FIG. 6, which adds a first new era block to the first new era genesis block 1000. As illustrated in FIG. 11, block 1105 having a block number n+3 may be added to the new era genesis block 1000. Method 600 of FIG. 6 may repeat where the nodes 205*b*-205*e* and/or 205*g*-205*h* add a block 1110 having block number n+4, a block 1115 having block number n+5, a block 1120 having block number n+6, and so on until another compression condition is detected at step 702 in method 700.

In various embodiments of method 700, at step 704, the data used to determine the root hash value 915 of the Merkle tree 900 may include the first genesis block or any new era genesis block (e.g., the new era genesis block 1000). As such, after the new era genesis block 1000 is created, the blockchain 220 effectively has only one block that is distributed amongst the nodes 205*b*-205*e*, 205*g*, and/or 205*h*. As discussed below, to access the data of any previous set of blocks, the node that stored the blockchain portion of the blockchain 220 that is used to generate the root hash value 1080 would be accessed based on the new era genesis block 1000. That node would determine from the last new era genesis block 1000 the node of the nodes 205*b*-205*e*, 205*g*, and/or 205*h* that stores the previous blockchain portion of the blockchain 220 and so on until the data is located. For example and referring to FIG. 2, if the blockchain portion 220(n) is the most recent compression of the blockchain 220 that includes the new era genesis block (n) 1000, then the new era genesis block (n-1) included in that blockchain portion 220(n) may include a root hash value 1080 and a database address 1090 of the blockchain portion 220(6) stored at node 205*g*. The new era genesis block (n-2) included in the blockchain portion 220(6) stored at node 205*g* may include a root hash value of the blockchain portion 220(5) stored at node 220*e* and the address for the node 220*e*. The various blockchain portions 220(1)-220(n) may be linked together via the root hash values of the new era genesis blocks included in those portions.

However, in other examples, the data used to determine the root hash value 915 of the Merkle tree 900 may not include the first genesis block or any new era genesis block (e.g., the new era genesis block 1000 or when the block 805 is a genesis block or new era genesis block) and may only include the blocks that come subsequent to the genesis block or the new era genesis block or a portion of those subsequent blocks. The header 1020*a* in the new era genesis block 1000 may include a previous genesis block hash data field (not illustrated). As such, after the new era genesis block 1000 is created, the blockchain 220 provides a compressed blockchain of new era genesis blocks that each have a root hash value of the blocks included in a blockchain portion each new era genesis block represents and a database address of a database on which those blocks that the new era genesis block represents is stored. Referring to the example blockchain 220 in FIG. 12, the new era genesis blocks 1205 and 1210 may be added to the new era genesis block 1000 after each time method 700 is performed. As such, the blockchain 220 that is distributed to the nodes 205*b*-205*e*, 205*g*, and/or 205*h* may include a new era genesis block for each blockchain portion 220(1)-220(n).

In other embodiments, each of the blocks subsequent to the new era genesis block 1000 may be compressed or have a data cropping technique performed on them prior to those blocks being used as data for determining the root hash value of a subsequent new era genesis block. The data compression or cropping may be performed to further decrease the amount of storage needed to store the blocks of the blockchain 220 in the various databases. In the example illustrated in FIGS. 8 and 9, one or more of blocks 805, 810, 815, and/or 820 may be compressed by the compression application on the nodes 205*b*-205*e*, 205*g*, and/or 205*h*. In various embodiments, the block data 375*a*, 375*b*, and/or 375*c* may be encoded using delta encoding. For example, the block data 375*a* in block 305*a* may be encoded such that a reference and a difference of the block data 375*a* is stored in the block 305*a*. Furthermore, amend operations (e.g., a change to the data leading to change (e.g., increase or decrease) in length or amount of the data) may be performed. Also, emend operations (e.g., change to the data not leading to change (e.g., increase or decrease) in length or amount of the data) may be performed. Other data cropping techniques of deleting or moving data may also be contemplated.

In yet other embodiments, data compression techniques may be performed on the block data 375*a*, 375*b*, and/or 375*c*. For example, some or all of the block data 375*b* in block 305*b* may be compressed with a compression algorithm such as, for example, a Lempel-Ziv-Markov chain algorithm (LZMA) and optionally hashed with SHA3-512. However, SHA3-512 may be optional as the block 305*b* is hashed. Furthermore, one of skill in the art in possession of the present disclosure will recognize that other compression algorithms may be contemplated.

In various embodiments, the block data 375*a*, 375*b*, and/or 375*c* may be cropped using interleaving techniques for fault tolerance and performance scalability. For example, the interleaving may be performed using Erasure coding-akin mechanisms. Shared segmented assignment may also reduce redundancy in storage as there is a reference/pointer to a look-up table. The Erasure coding-akin mechanism may provide high availability of the data and remove data redundancy. The pointer to shared segmented look-ups may only remove data redundancy. While specific compression and cropping techniques of individual blocks of the blockchain 220 are described, one of skill in the art in possession of the present disclosure will recognize that other compression and cropping techniques may be contemplated and fall under the scope of the present disclosure.

Figure 13:
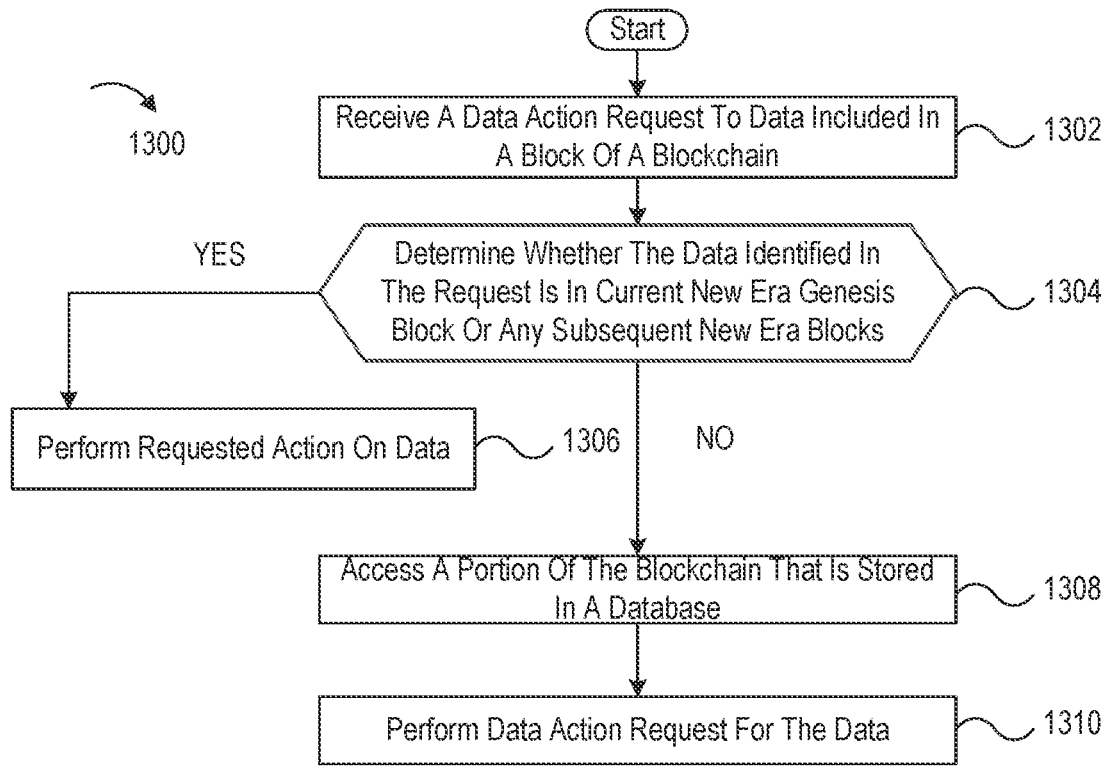
FIG. 13 is a flow diagram showing steps of an example method for accessing the data of a blockchain that is represented by a new era genesis block.

Referring now to FIG. 13, a method 1300 of accessing data on the blockchain is illustrated, according to various embodiments. Operations described relative to FIG. 13 may be performed, in various embodiments, by any suitable computer system and/or combination of computer systems, included in blockchain compression system 100 of FIG. 1. For convenience and ease of explanation, however, operations described below will simply be discussed relative to the nodes 205*b*-205*e*, 205*g*, and/or 205*h* of the blockchain network 200 of FIG. 2, which may be any of the blockchain networks 130*a*, 130*b*, and/or 130*c* of FIG. 1. Further, various elements of operations discussed below may be modified, omitted, and/or used in a different manner or different order than that indicated. Thus, in some embodiments, one or more of the nodes 205*a*-205*h* may perform one or more aspects described below, while another system might perform one or more other aspects.

The method 1300 may begin at step 1302 where a request to perform data action to data included in a first block of a first plurality of blocks of a blockchain is received. In an embodiment, at step 1302, a node of the nodes 205*a*-205*h* may receive a request to perform a data action to data that is stored in a blockchain portion 220(1) or up to 220(n) at a database managed by one or more of the nodes 205*a*-205*h*. In some embodiments, the requested data action may be associated with data that is not provided in a current distributed version of the blockchain 220 (e.g., the current new genesis node and a subsequent block linked to the current new genesis node). For example, prior to step 1302, the user 110 may query the blockchain data for verifying a transaction via, for example, a blockchain querying application executing on the first client device 120. The query may include identifying information associated with the transaction (e.g., a transaction identifier, a public key, a key word, a serial number, and/or any other identifying information that would be apparent to one of skill in the art in possession of the present disclosure). The first client device 120 may provide a request via an application programming interface (API) to a querying application executing on one or more of the nodes 205*a*-205*h*.

The method 1300 may then proceed to step 1304 where a determination is made as to whether any current new era genesis block or any subsequent new era blocks linked off the new era genesis block include the requested information. In an embodiment, at step 1304, the querying application executing on, for example, node 205*b* may search the transaction in the current distributed version of the blockchain 220 that includes the new era genesis block 1000 and any subsequent new era blocks that are subsequently linked to the new era genesis block 1000 such as, for example, blocks 1105, 1110, 1115, and/or 1120 as illustrated in FIG. 11. In an embodiment, the querying application may query block 1000, 1105, 1110, 1115, 1120 using the identifying information for the requested data/transaction. If any of the blocks includes the data that is being requested, the method 1300 may proceed to step 1306 where the query application performs an action based on the query request. For example, the query application may return the data that is requested to the user 110 via the first client device 120. In other examples, the block in which the data is located may be provided to the user 110 via the first client device 120. In other examples, the various hashing levels of the nodes in the hash tree that provide the root hash of the block in which the data is stored may be returned so that the client device 120 may reconstruct the hash of the block in which the data is located to verify that hash of the block to the hash of that block in the blockchain 220.

If at step 1304 of method 1300 it is determined that the current new era genesis block or any of the subsequent new era blocks linked off the new era genesis block do not include the requested data, the method 1300 may proceed to step 1308 where a first plurality of blocks is accessed from the database where the first plurality of blocks is not provided in a current distributed version of the blockchain, and are stored in a database associated with an entity. In an embodiment, at step 1308, the query application on the node that receives the query request from the client device 120 may query the new era genesis block 1000 for the root hash value 1080 and the database address 1090 where the previous blockchain portion of the blockchain 220 is stored. The query application on the node (e.g., the node 205b) may use the database address 1090 to forward or generate the query request to the node identified in the database address 1090 (e.g., node 205h) that stores the previous portion (e.g., blockchain portion 220(n)) of the blockchain 220 that was used to generate the new era genesis block 1000. The query request may be made between nodes by the query applications via an API. The node that receives the query request (e.g., node 205h that stores the blockchain portion 220(n)) may query, via its query application, the blockchain portion 220(n) that is identified by the root hash value 1080 and/or query any of the block data for the identifying information in the blockchain portion 220(n) and/or any other blockchain portion that may be stored at the node 205h.

If the queried data is not located in the blockchain portion 220(n), the node 205h may forward the query to the node that has the previous blockchain portion 220(n-1) or 220(6) in the illustrated example. The node 205h may identify the previous blockchain portion 220(6) in the header 1020a of the new era genesis block 1000 that is in the blockchain portion 220(n). For example, the header 1020a of the new era genesis block 1000 that is in the blockchain portion 220(n) may include the root hash value of the blockchain portion 220(6) and the database address 1090 for the node 205g where the blockchain portion 220(6) is stored.

The node 205g that receives the query request may query, via its query application, the blockchain portion 220(6) that is identified by the root hash value 1080 in the new era genesis block 1000 in the blockchain portion 220(6) and/or query any of the block data for the identifying information in the blockchain portion 220(6) and/or any other blockchain portion that may be stored at the node 205g. If the data in the query request is not located in the blockchain portion 220(6), the query application for the node 205g may further query other blockchain portions using the root hash value 1080 and the database address 1090 located in the new era genesis block in the blockchain portion 220(6). The nodes 220a-220h may continue searching previous portions of the blockchain 220 until the identifying information is found.

Figure 12:
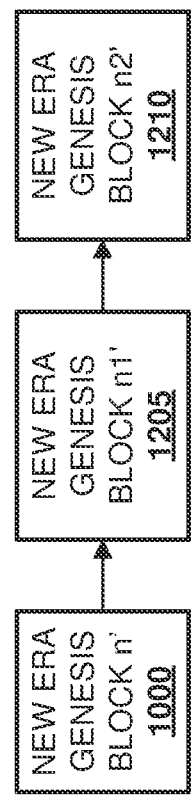
FIG. 12 illustrates an example blockchain that includes a plurality of new era genesis blocks that each represent a portion of the blockchain generated during the method of FIG. 7.

The above example illustrates when the genesis block or new era genesis block is included as data for the Merkle tree that is used to create the root hash value of a set of blocks of the blockchain 220. However, if the genesis block and/or new era genesis blocks are not provided as data for the Merkle tree, then at step 1308 the example illustrated in FIG. 12 is present where a new era genesis block is linked to a previous new era genesis block. The query application of the node that receives the query request may query each node that is identified in the database address 1090 and the root hash value 1080 of the blockchain portion that is used to generate the root hash value 1080 found in that new era genesis blocks. For example, the node 205a may query the node identified in new era genesis block 1210 to query the portion of the blockchain 220 that is used to generate the root hash value included in the new era genesis block 1210. If that blockchain portion does not include the identifying information, then the node 205a may query the node identified in new era genesis block 1205. If the blockchain portion that is associated with the root hash value identified in the new era genesis block 1205 does not include the identifying information, then the node 205a may query the node identified in new era genesis block 1000 and so on until the identifying information is found.

The method 1300 then proceeds to step 1310 where an action is performed for the data based on the query request. In an embodiment, at step 1310, the query application may perform one or more actions based on the data action request included in the query request. For example, the data action may include the query application returning the data that is requested to the user 110 via the first client device 120. In other examples, the data action may include the block in which the data is located may returned to the user 110 via the first client device 120. In other examples, the various hashing levels of the nodes in the hash tree that provide the root hash of the block in which the data is stored may be returned so that the client device 120 may reconstruct the hash of the block in which the data is located to verify that hash of the block to the hash of that block in the blockchain 220. In other examples, any of the non-leaf nodes 910a or 910b and any of the leaf nodes 905a-905d that are required to reconstruct the root hash node to verify that the blockchain portion 220(1) and/or up to 220(n) may be returned so that the client device 120 may reconstruct the root hash node of the blockchain portion 220(1) and/or up to 220(n) in which the data is located to verify that root hash value returned is the data represented by the root hash value 1080 in the new era genesis block 1000. For example, if the user 110 has the block data in block 805, the user 110 may reconstruct the root hash value 915 if the user 110 also has the value of leaf node 905b and the value of the non-leaf node 910b. As such the query application of the node may provide, in response to the data action request by the client device 120, the first block in which the data identified in the identifying information is located and the other hash values in the Merkle tree 900 necessary to derive the root hash value such that the root hash value 915 in the new era genesis block 1000 can be verified by a user 110 making the data action request.

In various embodiments of method 1300, when a node of the nodes 205b-205e, 205g, and/or 205h receives a query request, locates the data identified in the query request in its database, and performs that action associated with the query request, the node of the nodes 205b-205e, 205g, and/or 205h may receive a hosting fee for storing and serving up the information for that query/data action request. The payment may be through various node accounts that are associated with each node or for each entity that is associated with the node. In some embodiments, the payment may be made using a cryptocurrency that is used for the blockchain 220 and the transaction may be recorded in the blockchain 220. However, in other examples, the payment of funds may be through transferring of funds between accounts of one entity or another via the query application without any record of the transaction in the blockchain 220. The hosting fee may be used to incentivize one or more entities or node 205a-205h to host the various blockchain portions that are compressed by hashing the blocks to obtain a root hash value of a Merkle tree to represent that blockchain portion.

Figure 14:
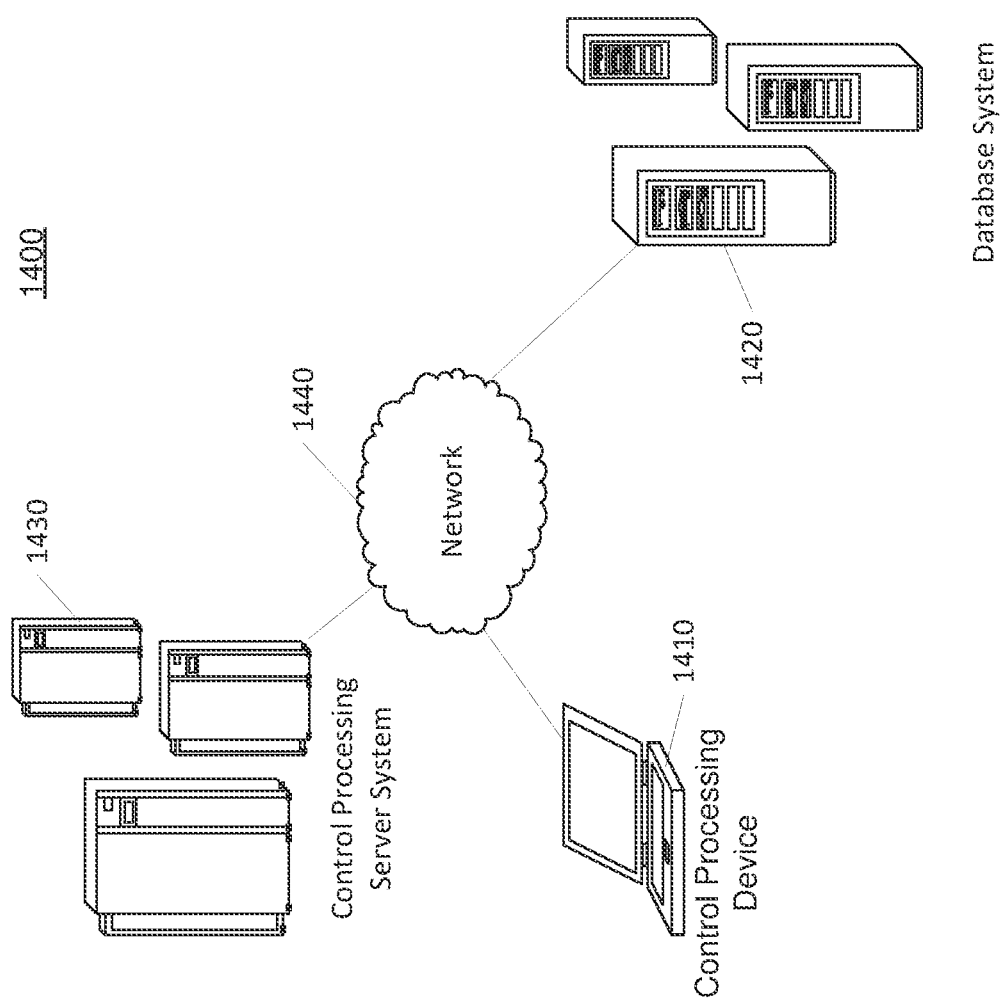
FIG. 14 illustrates an example system.

Thus, the systems and methods of the present disclosure describe blockchain compression that may compress a blockchain by calculating a hash root value of a set of blocks of the blockchain when the blockchain satisfies a blockchain compression condition. The set of blocks or the portion of the blockchain may be used as data for a Merkle tree. The blockchain portion that includes the blocks on which the root hash value of the Merkle tree is based may be stored in an entities database. The nodes of the blockchain network may generate a new era genesis block that includes a database address where the blocks are stored and the root hash value representing those blocks. The new ere genesis block may be the blockchain that is distributed to other nodes and on which additional blocks may be added to the blockchain. As such, the blockchain may periodically be compressed and distributed and any prior compressed blocks can be accessed by referencing the root hash value new era genesis block and the database address in the new era genesis block. As such, the systems and methods of the present disclosure reduce network costs of transmitting and distributing a large blockchain. Furthermore, the blockchain of the present disclosure reduces the storage requirements of the nodes by distributing a compressed version of the blockchain Computing Device FIG. 14 shows a system 1400. The system 1400 may include at least one client device 1410, at least one database system 1420, and/or at least one server system 1430 in communication via a network 1440. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 14.

Client device 1410 may access server applications and/or resources using one or more client applications (not shown) as described herein. Client device 1410 may be a mobile device, such as a laptop, smart phone, mobile phones, or tablet, or computing devices, such as a desktop computer or a server, wearables, embedded devices. Alternatively, client device 1410 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 1420 may be configured to maintain, store, retrieve, and update information for server system 1430. Further, database system may provide server system 1430 with information periodically or upon request. In this regard, database system 1420 may be a distributed database capable of storing, maintaining, and updating large volumes of data across clusters of nodes. Database system 1420 may provide a variety of databases including, but not limited to, relational databases, hierarchical databases, distributed databases, in-memory databases, flat file databases, XML databases, NoSQL databases, graph databases, and/or a combination thereof.

Server system 1430 may be configured with a server application (not shown) that is capable of interfacing with client application and database system 1420 as described herein. In this regard, server system 1430 may be a stand-alone server, a corporate server, or a server located in a server farm or cloud-computer environment. According to some examples, server system 1430 may be a virtual server hosted on hardware capable of supporting a plurality of virtual servers.

Network 1440 may include any type of network. For example, network 1440 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 1400 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 1400. Web services built to support a personalized display system may be cross-domain and/or cross-platform and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 1400 in front of one or more computing devices such that any external devices may communicate directly with the specialized hardware.

Figure 15:
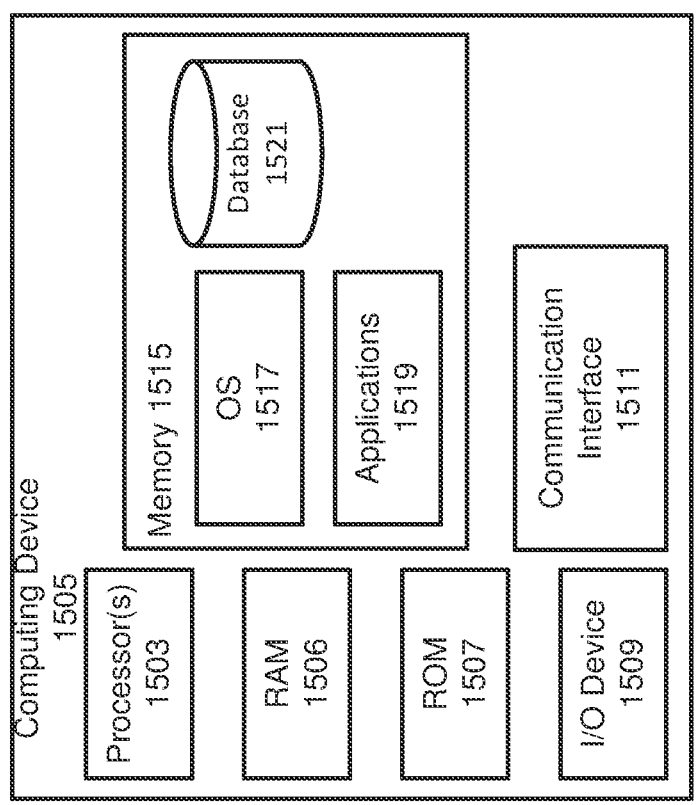
FIG. 15 illustrates an example computing device.

Turning now to FIG. 15, a computing device 1505 that may be used with one or more of the computational systems is described. The computing device 1505 may include a processor 1503 for controlling overall operation of the computing device 1505 and its associated components, including RAM 1506, ROM 1507, input/output device 15011, communication interface 1511, and/or memory 1515. A data bus may interconnect processor(s) 1503, RAM 1506, ROM 1507, memory 1515, I/O device 1509, and/or communication interface 1511. In some embodiments, computing device 1506 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 1509 may include a microphone, keypad, touch screen, and/or stylus motion, gesture, through which a user of the computing device 1500 may provide input and may also include one or more of a speaker for providing audio output and a video display device for providing textual, audiovisual, and/or graphical output. Software may be stored within memory 1515 to provide instructions to processor 1503 allowing computing device 1500 to perform various actions. For example, memory 1515 may store software used by the computing device 1500, such as an operating system 1517, application programs 1519, and/or an associated internal database 1521. The various hardware memory units in memory 1515 may include volatile and nonvolatile, removable and non-removable media implemented in any method or technology for storage of information such as computer-readable instructions, data structures, program modules, or other data. Memory 1515 may include one or more physical persistent memory devices and/or one or more non-persistent memory devices. Memory 1515 may include, but is not limited to, random access memory (RAM) 1506, read only memory (ROM) 1507, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 1503.

Communication interface 1511 may include one or more transceivers, digital signal processors, and/or additional circuitry and software for communicating via any network, wired or wireless, using any protocol as described herein.

Processor 1503 may include a single central processing unit (CPU), which may be a single-core or multi-core processor, or may include multiple CPUs. Processor(s) 1503 and associated components may allow the computing device 1500 to execute a series of computer-readable instructions to perform some or all of the processes described herein. Although not shown in FIG. 15, various elements within memory 1515 or other components in computing device 1500, may include one or more caches, for example, CPU caches used by the processor 1503, page caches used by the operating system 1517, disk caches of a hard drive, and/or database caches used to cache content from database 1521. For embodiments including a CPU cache, the CPU cache may be used by one or more processors 1503 to reduce memory latency and access time. A processor 1503 may retrieve data from or write data to the CPU cache rather than reading/writing to memory 1515, which may improve the speed of these operations. In some examples, a database cache may be created in which certain data from a database 1521 is cached in a separate smaller database in a memory separate from the database, such as in RAM 1506 or on a separate computing device. For instance, in a multi-tiered application, a database cache on an application server may reduce data retrieval and data manipulation time by not needing to communicate over a network with a back-end database server. These types of caches and others may be included in various embodiments and may provide potential advantages in certain implementations of devices, systems, and methods described herein, such as faster response times and less dependence on network conditions when transmitting and receiving data.

Although various components of computing device 1505 are described separately, functionality of the various components may be combined and/or performed by a single component and/or multiple computing devices in communication without departing from the invention.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system, comprising:
a non-transitory memory; and
one or more hardware processors coupled to the non-transitory memory and configured to execute instructions from the non-transitory memory to cause the system to perform operations comprising:
receiving a data access request for data associated with a blockchain system that is distributed across a plurality of computer nodes;
accessing a compressed blockchain associated with the blockchain system via a first computer node of the plurality of computer nodes, wherein the compressed blockchain comprises (i) a first genesis block generated based on a first plurality of blocks associated with the blockchain system and (ii) a second plurality of blocks chained to the first genesis block;
determining that the data is not stored in the second plurality of blocks;
accessing a root hash value and a database address stored in the first genesis block;
retrieving the data based on querying a database corresponding to the database address using the root hash value; and
providing the data to a device.

2. The system of claim 1, wherein the database is associated with the first computer node.

3. The system of claim 1, wherein the database is associated with a server different from the first computer node, and wherein the operations further comprise establishing a connection with the server via a network.

4. The system of claim 1, wherein the operations further comprise:
prior to the receiving the data access request, determining that a blockchain compression condition associated with the blockchain system has been satisfied;
determining that a blockchain associated with the blockchain system comprises the first plurality of blocks; and
compressing the blockchain based on the first plurality of blocks.

5. The system of claim 4, wherein the compressing the blockchain comprises:
generating the root hash value for the first plurality of blocks based on performing one or more hash operations on the first plurality of blocks;
storing the first plurality of blocks in the database; and
generating the first genesis block based on the root hash value and the database address associated with the database.

6. The system of claim 4, wherein the operations further comprise:
subsequent to the compressing the blockchain, receiving a request to add a second block to the blockchain system; and chaining the second block to the first genesis block within the compressed blockchain.

7. The system of claim 1, wherein the operations further comprise:
in response to detecting a blockchain compression condition associated with the blockchain system, compressing the compressed blockchain based on the second plurality of blocks.

8. A non-transitory machine-readable medium having stored thereon machine-readable instructions executable to cause a machine to perform operations comprising:
receiving a data access request for data associated with a blockchain system that is distributed across a plurality of computer nodes;
accessing a compressed blockchain associated with the blockchain system via a first computer node of the plurality of computer nodes, wherein the compressed blockchain comprises (i) a first genesis block generated based on a first set of blocks associated with the blockchain system and (ii) a second set of blocks that is chained to the first genesis block;
determining that the data is not stored in the second set of blocks;
accessing a root hash value and a database address stored in the first genesis block;
retrieving the data based on querying a database corresponding to the database address using the root hash value; and
providing the data to a device.

9. The non-transitory machine-readable medium of claim 8, wherein the database is associated with the first computer node.

10. The non-transitory machine-readable medium of claim 8, wherein the database is associated with a server different from the first computer node, and wherein the operations further comprise establishing a connection with the server via the network.

11. The non-transitory machine-readable medium of claim 8, wherein the operations further comprise:
prior to the receiving the data access request, determining that a blockchain compression condition associated with the blockchain system has been satisfied;
determining that a blockchain associated with the blockchain system comprises the first set of blocks; and
compressing the blockchain based on the first set of blocks.

12. The non-transitory machine-readable medium of claim 11, wherein the compressing the blockchain comprises:
generating the root hash value for the first set of blocks based on performing one or more hash operations on the first set of blocks;
storing the first set of blocks in the database; and
generating the first genesis block based on the root hash value and the database address associated with the database.

13. The non-transitory machine-readable medium of claim 8, wherein the operations further comprise:
in response to detecting a blockchain compression condition associated with the blockchain system, compressing the compressed blockchain based on the second set of blocks.

14. A method comprising:
receiving a request for accessing data associated with a blockchain system;
accessing a blockchain associated with the blockchain system, wherein the blockchain comprises (i) a first genesis block generated based on a first plurality of blocks associated with the blockchain system and (ii) a second plurality of blocks chained to the first genesis block;
determining that the data is not stored in the second plurality of blocks;
accessing a root hash value and a database address stored in the first genesis block;
retrieving the data based on querying a database corresponding to the database address using the root hash value; and
providing the data to a device.

15. The method of claim 14, wherein the request is received via a first computer node associated with the blockchain system, and wherein the database is associated with the first computer node.

16. The method of claim 14, wherein the request is received via a first computer node associated with the blockchain system, wherein the database is associated with a second computer node different from the first computer node, and wherein the method further comprises establishing a connection with the second computer node via a network.

17. The method of claim 14, further comprising:
prior to the receiving the request, detecting a blockchain compression condition associated with the blockchain system;
determining that a blockchain associated with the blockchain system comprises the first plurality of blocks; and
compressing the blockchain based on the first plurality of blocks.

18. The method of claim 17, wherein the compressing the blockchain comprises:
generating the root hash value for the first plurality of blocks based on performing one or more hash operations on the first plurality of blocks;
storing the first plurality of blocks in the database; and
generating the first genesis block based on the root hash value and the database address associated with the database.

19. The method of claim 17, further comprising:
subsequent to the compressing the blockchain, receiving a second request to add a second block to the blockchain system; and
chaining the second block to the first genesis block within the blockchain.

20. The method of claim 14, further comprising:
in response to detecting a blockchain compression condition associated with the blockchain system, compressing the blockchain based on the second plurality of blocks.

* * * * *